United States Patent [19]

Yasutake

[11] Patent Number: 4,517,933
[45] Date of Patent: May 21, 1985

[54] CRANK SHAFT OF V-TYPE INTERNAL-COMBUSTION ENGINE

[75] Inventor: Kousuke Yasutake, Kawagoe, Japan

[73] Assignee: Honda Giken, Kogyo Kabushiki Kaisha, Tokyo, Japan

[21] Appl. No.: 540,589

[22] Filed: Oct. 11, 1983

[30] Foreign Application Priority Data

Oct. 9, 1982 [JP] Japan .................... 57-177987

[51] Int. Cl.³ ............................................ F02B 75/06
[52] U.S. Cl. ........................... 123/55 VF; 123/55 VS; 123/192 B; 74/603
[58] Field of Search ............ 123/192 B, 192 R, 55 V, 123/55 VE, 55 VS, 55 VF; 74/603, 604

[56] References Cited

U.S. PATENT DOCUMENTS

| | | | |
|---|---|---|---|
| 1,749,807 | 3/1930 | Ford | 74/603 |
| 2,218,332 | 10/1940 | Fowler | 74/603 |
| 2,632,340 | 3/1953 | Dolza et al. | 123/55 VS |
| 3,166,054 | 1/1965 | Conover | 74/603 |

FOREIGN PATENT DOCUMENTS 135768 10/1981 Japan ................... 74/603

*Primary Examiner*—Craig R. Feinberg
*Assistant Examiner*—David A. Okonsky
*Attorney, Agent, or Firm*—Armstrong, Nikaido Marmelstein & Kubovcik

[57] ABSTRACT

A V-type internal-combustion engine comprises first and second cylinders arranged so as to form a V shape on a vehicle body frame, a piston slidably and reciprocally engaged in each of the first and second cylinders, and a crank shaft connected to the pistons by connecting rods. The crank shaft comprises a central web, side webs arranged on both sides of the central web, and two crank pins carried by the central and each of the side webs and connected to the connecting rods. The crank pins are arranged so that the rotary phases thereof with respect to the central axis of the crank shaft are offset by an angle $\alpha$ from each other. The side webs each carry a balancer weight of a mass W/2 corresponding to half the sum of half the mass of the reciprocating part and the mass of the rotating parts of one cylinder in such a manner that the center of gravity of each balancer weight is positioned at the crank radius r (the distance from the central axis to the crank pin center) from the central axis of the crank shaft on the side opposite to the crank pin across the central axis of the crank shaft. The central web carries a balancer weight of a mass of $W \times \cos(\alpha/2)$ in such a manner that its center of gravity is positioned at a distance of the crank radius r along a line bisecting the angle between the crank pins, on the side opposite to the crank pins across the central axis of the crank shaft. Engine vibrations caused by the masses of the reciprocating and rotating parts can be reduced markedly with this construction.

4 Claims, 10 Drawing Figures

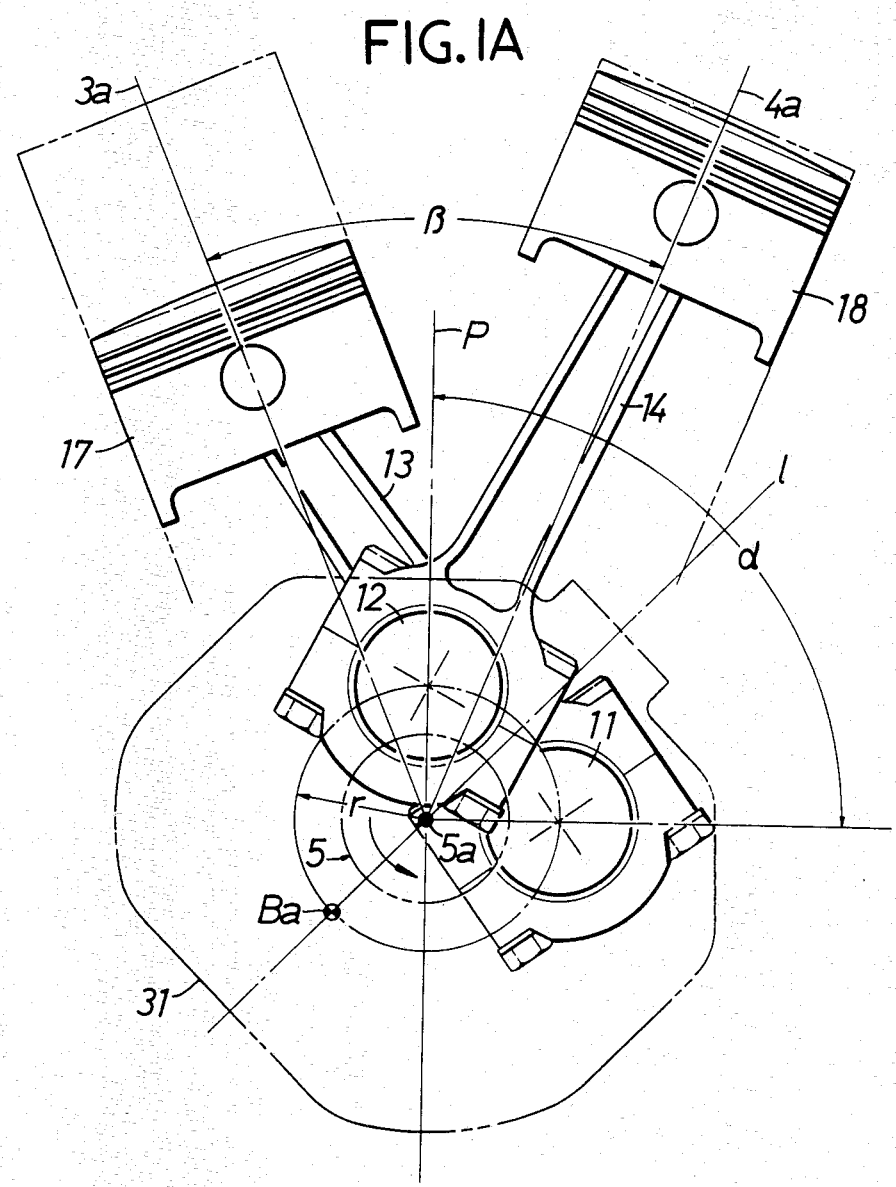
FIG. IA

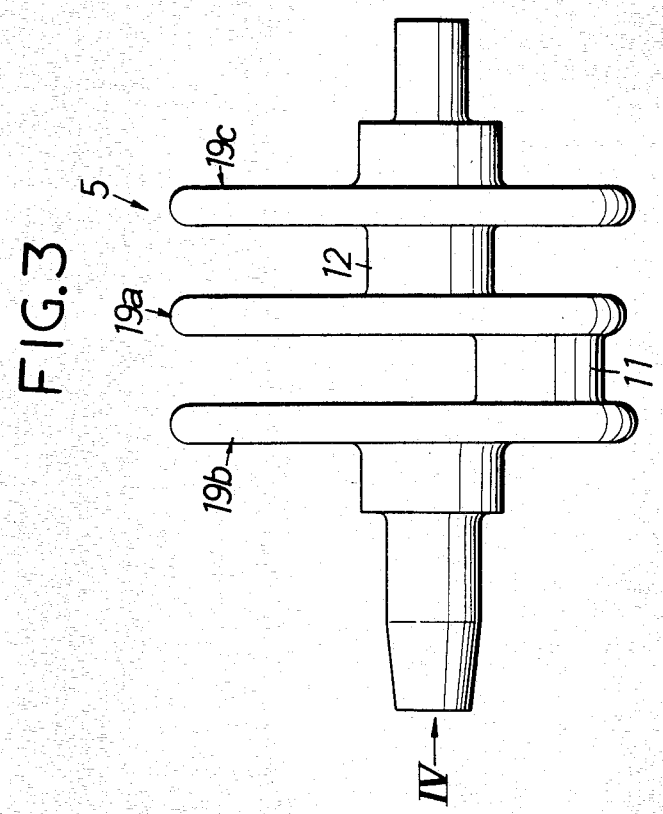
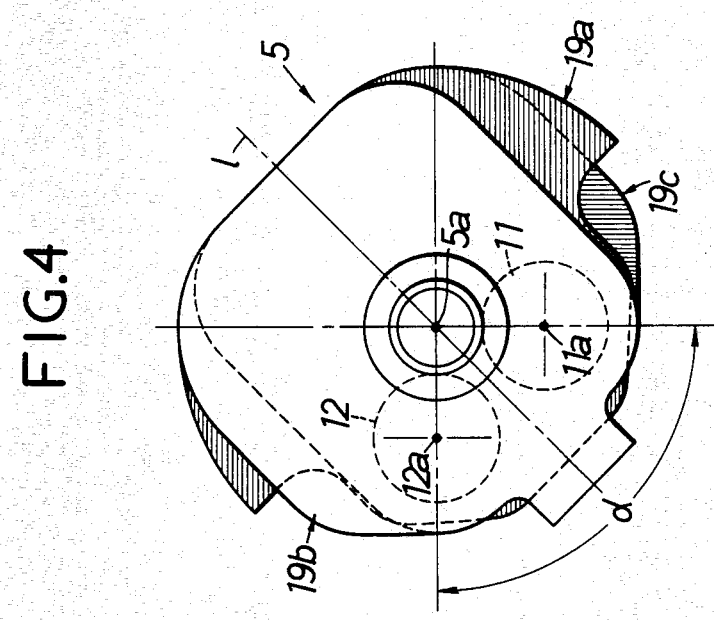

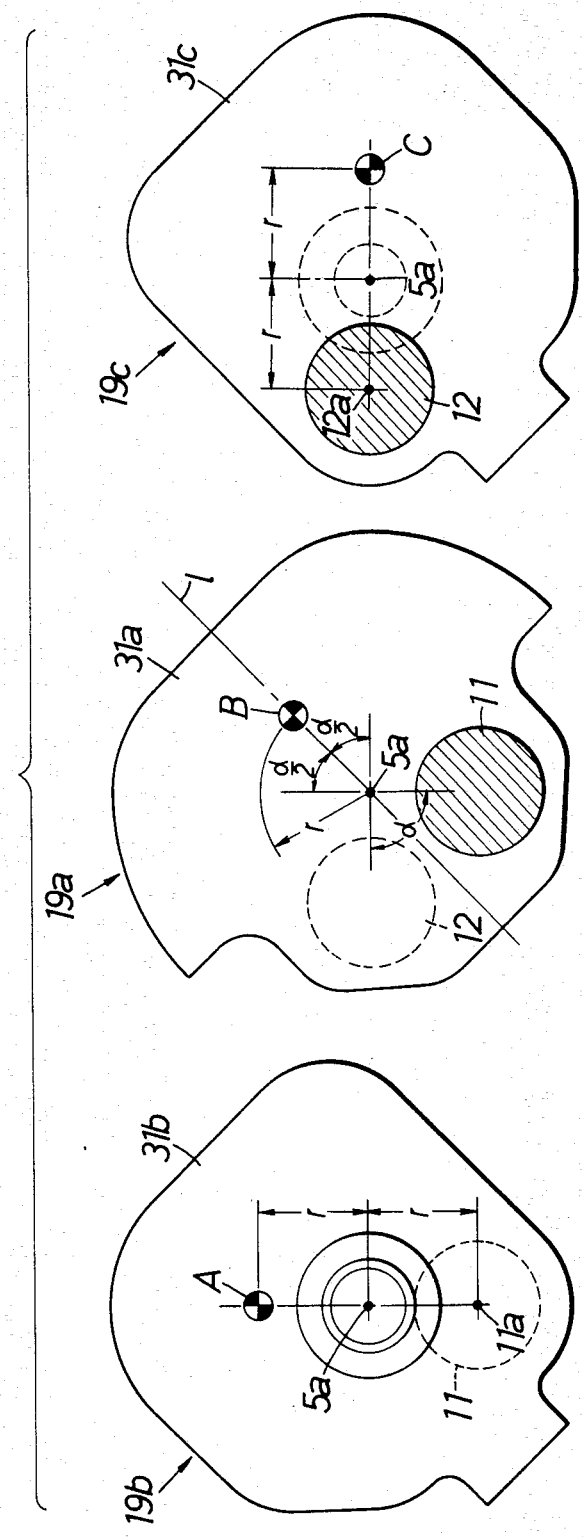

CRANK SHAFT OF V-TYPE INTERNAL-COMBUSTION ENGINE

BACKGROUND OF THE INVENTION

1. Field of the Invention

This invention relates generally to a crank shaft of a V-type internal-combustion engine and particularly to a 3-web, 2-pin crank shaft comprising two crank pins each connected via piston rods to plurality of pistons engaged slidably in a plurality of cylinders being arranged in a V shape, with three crank webs carrying the crank pins.

2. Description of the Prior Art

In a V-type multi-cylinder internal-combustion engine, the primary inertia force exerted by the mass of the reciprocating parts on the crankshaft can be cancelled out by offsetting the rotary phases of the two crank pins by an angle of $\pi-2\beta$, where $\beta$ is the angle between the central axes of the cylinders arranged in the V shape. This construction, however, results in a couple of the forces due to the mass of the rotating parts such as the big ends of the connecting rods connected to each crank pin, causing undesirable vibrations in the engine.

SUMMARY OF THE INVENTION

It is therefore an object of this invention to provide a crank shaft of a V-type internal-combustion engine of the type described above, which is able to cancel any couple of the forces caused by the mass of the rotating parts because of the difference between the rotary phases of the two crank pins, whereby engine vibrations can be reduced markedly.

To achieve the above object, this invention provides a crank shaft of a V-type internal-combustion engine having first and second cylinders arranged to form a V shape on a vehicle body frame: a piston slidably and reciprocally engaged in each of the first and second cylinders; and a crank shaft connected to the pistons by connecting rods; the crank shaft comprising a central web, side webs arranged on both sides of the central web, and two crank pins carried between the central web and each of the side webs and connected to the connecting rods, wherein the crank pins are arranged so that the rotary phases thereof with respect to the central axis of the crank shaft are offset by an angle of $\alpha$ from each other, the side webs each carry a balancer weight having a mass of $W/2$ corresponding to half the sum $W$ of half of the mass of the reciprocating parts and the mass of the rotating parts for one cylinder in such a manner that the center of gravity of the balancer weight is positioned at a distance of the crank radius r (the distance from the central axis of the crank shaft to the crank pin center) from the central axis of the crank shaft on the side opposite to the crank pin across the central axis of the crank shaft, and the central web carries a balancer weight having a mass of $W \times \cos(\alpha/2)$ in such a manner that its center of gravity is positioned at the distance of the crank radius r along a line bisecting the angle $\alpha$ between the crank pins on the side opposite to the crank pins across the central axis of the crank shaft.

The above and other objects, features and advantages of the present invention will become apparent from the following description of a preferred embodiment of this invention with reference to the accompanying drawings.

BRIEF DESCRIPTION OF THE DRAWINGS

In the drawings:

FIG. 1A is an enlarged side elevation showing an essential part of the engine of FIG. 1;

FIG. 3 is an enlarged side elevation of the crank shaft according to this invention;

FIG. 4 is similar to FIG. 3 but is taken in the direction of the arrow IV;

FIG. 5 is an exploded sectional view of the crank shaft;

FIGS. 6-9 are explanatory views showing the principle of the present invention, of which:

FIG. 6 is a schematic view showing the relative position of the two crank pins;

FIG. 7 is a diagram showing the relationship between the bearings at the two ends of a connecting rod and the mass of the rotary parts exerted on each crank pin;

FIG. 8 is a diagram of the couple applied to one bearing; and

FIG. 9 is a diagram of the couple applied to the other bearing.

DESCRIPTION OF THE PREFERRED EMBODIMENTS

Several examples of a crank shaft of a V-type internal-combustion engine according to this invention will be described in the paragraphs below with reference made to the accompanying drawings.

Figure 1:
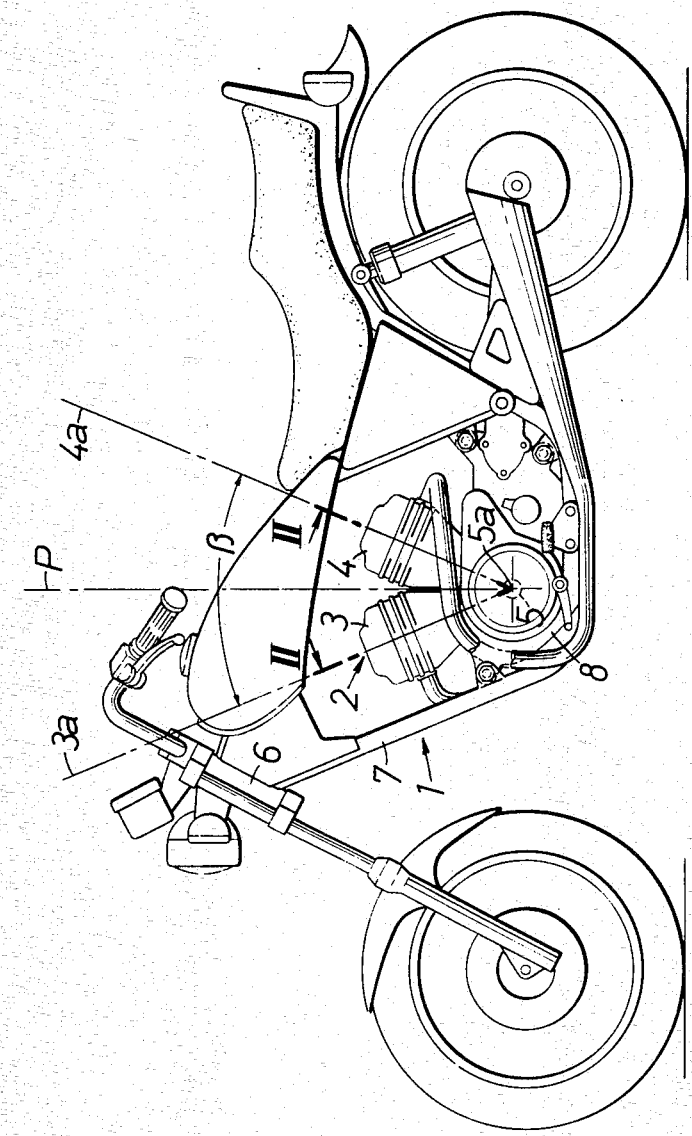
FIG. 1 is a side elevation illustrating a two-wheeled motor vehicle provided with the internal combustion engine with a crank shaft according to this invention.

FIG. 1 shows a two-wheeled motor vehicle equipped with a V-type 2-cylinder internal-combustion engine E with a crank shaft constructed according to the present invention.

In FIG. 1, a body frame 1 of the two-wheeled motor vehicle is equipped with a two-cylinder engine 2 so that a pair of engine blocks 3, 4 are located longitudinally along the body frame so as to form a V shape, and a crank shaft 5 common to the pair of engine blocks is arranged at right angles to the longitudinal direction of the body frame.

The engine 2 is placed in the body frame 1 which is cradle-shaped and includes a front cylinder block 3, whose central axis 3a is substantially parallel to a down tube 7 of the body frame extending downward and rearward from a head pipe 6.

To reduce the length of the engine 2 in the longitudinal direction of the vehicle body, the front and rear engine blocks 3, 4 are arranged so that the angle $\beta$ between the central axes 3a, 4a thereof is less than 90° (45° in the illustrated example), and the central axes 3a, 4a are positioned symmetrically about a vertical plane P passing through the central rotary axis 5a of the crank shaft 5, that is, at equal angles to the vertical plane.

Figure 2:
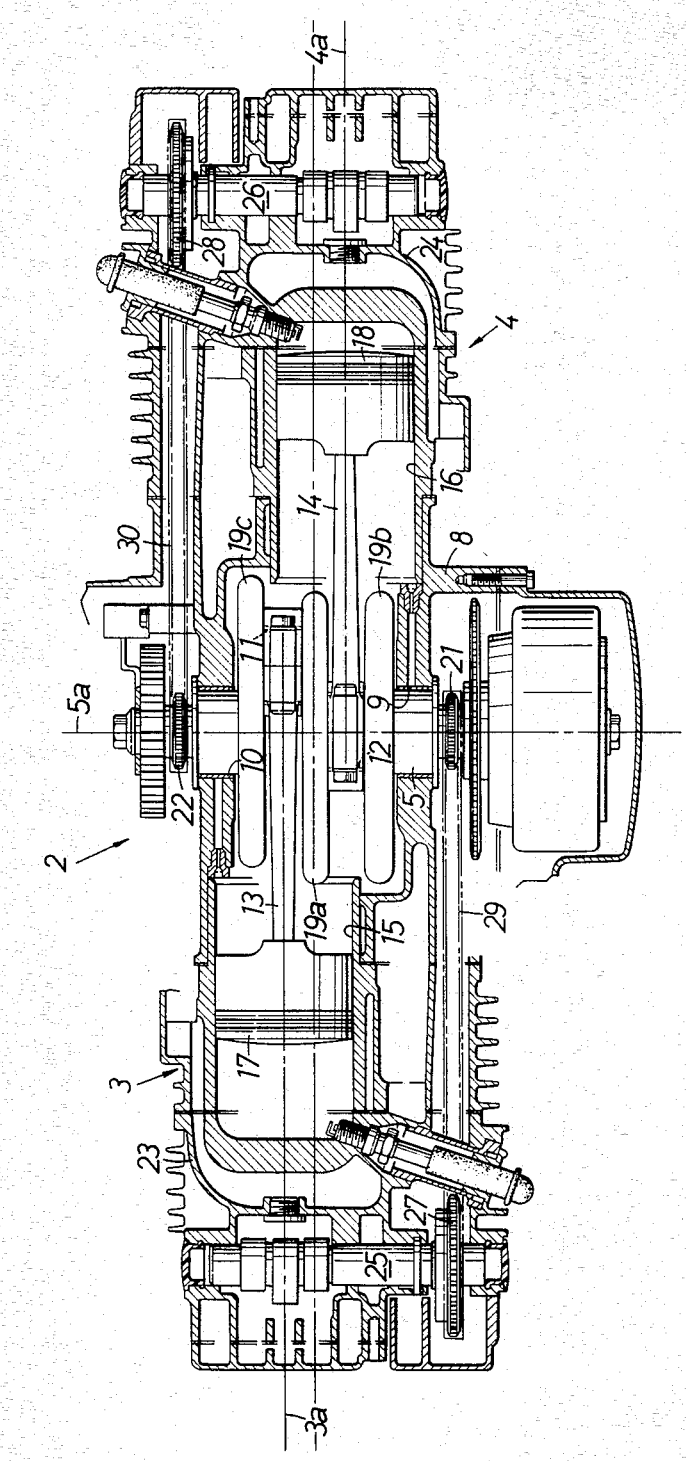
FIG. 2 is a section along the line II—II of FIG. 1.
Figure 6:
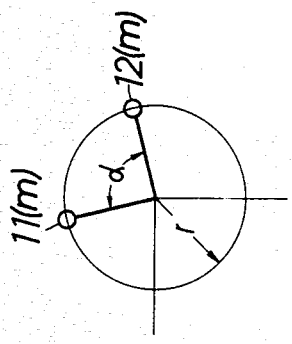

As shown in FIG. 2, the front and rear engine blocks 3, 4 each consists of a front and rear cylinder 15, 16 and a front and rear cylinder head 23, 24 secured to the top surface of the corresponding cylinder 15, 16.

The crank shaft 5 is rotatably supported in a crank/transmission case 8 by bearings 9, 10 at the intersection of the central axes of the front and rear engine blocks 3, 4, that is, of the central axes 3a, 4a of the front and rear cylinders 15, 16. The crank shaft comprises first and second crank pins 11, 12, a first, central crank web 19a carrying the crank pins, and second and third crank webs 19b, 19c located at equal distances from the central crank web. Pistons 17, 18 slidably engaged in said front and rear cylinders 15, 16 are connected to said first and second crank pins 11, 12 by first and second connecting rods 13, 14, respectively.

Driving sprocket wheels 21, 22 are secured to both ends of the crank shaft 5, while driven sprocket wheels 27, 28 are secured to valve cam shafts 25, 26 on opposite sides to each other, the cam shafts 25, 26 being rotatably carried on the top of the front and rear cylinder heads 23, 24, respectively. Endless timing chains 29, 30 are hung around each of the driving sprocket wheels 21, 22 and the driven sprocket wheels 27, 28 so that the rotation of the crank shaft 5 is transmitted to the valve cam shafts 25, 26 by the timing chains 29, 30.

When, as described above, the engine blocks 3, 4 are arranged so that their central axes 3a, 4a are at an angle of less than 90°, the primary part of the inertial forces caused by the reciprocating masses such as that of the pistons 17, 18 cannot be cancelled out by providing a balancer weight on the crank shaft 5 if the piston 17 or 18 within the front or rear cylinder 15, 16 is connected to a common crank pin on the crank shaft 5 by the connecting rod 13 or 14.

Therefore, in order to cancel out the primary part of the inertial forces, as shown in FIG. 1A, the first and second connecting rods 13, 14 are connected to respective crank pins 11, 12 of the crank shaft 5 in such a manner that the rotary phases of the crank pins 11, 12 are offset by a certain angle of $\alpha$, and that a balancer weight having a predetermined mass of Ba is provided on a line l, which bisects the angle $\alpha$ between the crank pins 11, 12, on the side opposite to the crank pins 11, 12 at a distance apart from the central axis 5a of the crank shaft 5, which distance is equal to the crank radius r of the crank pins 11, 12.

As a result, the aforementioned angle $\alpha$ between the crank pins 11, 12 and the mass Ba are obtained from the following equations:

$$\alpha = \pi - 2\beta$$

$$Ba = M \cdot \sin \beta = M \cdot \sin \left( \frac{\pi}{2} - \frac{\alpha}{2} \right)$$

$$= M \cdot \cos \frac{\alpha}{2}$$

However, with the balancer weight provided only on the first, central crank web 19a, the mass of the first, central crank web 19a becomes essentially greater than that of the second and third crank webs on both sides, 19b, 19c. To avoid this, the balancer weight is divided into three parts 31a, 31b, 31c which are attached to all of the crank webs 19a, 19b, 19c. Specifically, the first, central crank web 19a is provided with half of the total mass M cos $\alpha$/2, and the second and third crank webs 19b, 19c between them are provided with the other half of the mass. The arrangement of the balancer weight is such that balancer weights 31b, 31c each having a mass of (M cos $\alpha$/2)/4 are provided on the second and third crank webs 19b, 19c at a phase 180° opposite to the crank pins 11, 12 at a distance of the crank radius r from the central axis 5a of the crank shaft 5, where r is the distance between the central axis 5a and the centers 11a, 12a of each of the crank pins 11, 12.

However, in this case, the mass m of the rotating parts such as the big ends of the connecting rods 13, 14 causes unbalanced couples Ma, Mb which are not opposite to each other at each bearing 9, 10 of the crank shaft 5 because of the offset of the rotary phase between the crank pins 11, 12. This results in undesirable engine vibrations.

Figure 7:
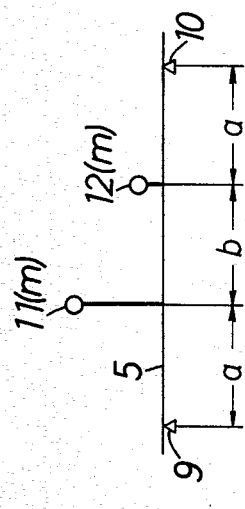
Figure 8:
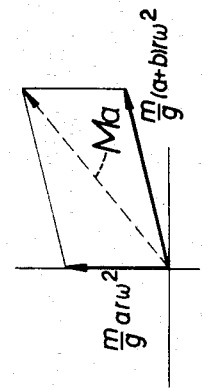
Figure 9:
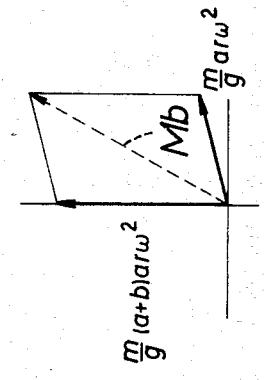

According to this invention, the above unbalanced couples Ma, Mb can be cancelled out in a manner that will be discussed below. The principle of this invention will be explained with reference to FIGS. 6–9. When the crank shaft is rotating at an angular speed $\omega$, equal centrifugal forces F are exerted on each crank pin 11, 12 because of the mass m of the rotating parts. These forces are expressed by the following equation:

$$F = (m/g) \cdot r \cdot \omega^2$$

where
 m : mass of rotating parts
 g: acceleration due to gravity
 r: crank radius
 $\omega$: angular velocity of crank shaft Assuming that, as shown in FIG. 7, the axial distance between the center of one of the crank pins 11, 12 and the center of the bearing 9, 10 nearest the crank pin is a, and the axial distance between the centers of the crank pins 11, 12 is b, the above unbalanced couples Ma, Mb can be expressed by the following equations, and are shown in FIGS. 8, 9, $$Ma = \vec{F}_1 \cdot a + \vec{F}_2 \cdot (a+b)$$

$$Mb = \vec{F}_1 \cdot (a+b) + \vec{F}_2 \cdot a$$

If the unbalanced couples Ma, Mb applied to the bearings 9, 10 of the crank shaft 5 act at 180° to each other, these couples Ma, Mb can be cancelled out by providing balancer weights corresponding to these couples on the side crank webs 19b, 19c. However, if the directions of the couples are not 180° opposite, these couples cannot be cancelled out in the manner described above.

However, it is possible to cancel the couples Ma, Mb caused by the mass of the rotating parts by providing a balancer weight also on the central crank web 19a, and by selecting appropriate positions for the balancer weights on the three webs 19a, 19b, 19c as well as an appropriate distribution of weight for the balancer weights. The distribution is such that, as shown in FIG. 5, the side webs 19b, 19c are provided with balancer weights 31b, 31c having a mass corresponding to half the sum of half of the mass of the reciprocating parts and the mass of the rotating parts for one cylinder in such a manner that the center of gravity thereof is positioned at a distance of the crank radius r from the central axis of the crank shaft on the side opposite the crank pin across the central axis of the crank shaft. The center web is provided with a balancer weight having a mass of W×cos ($\alpha$/2) in such a manner that its center of gravity is positioned on a line (l) bisecting the angle $\alpha$ between the crank pins on the side opposite to said crank pin 11, 12 across the central axis 5a of the crank shaft 5, at a distance of the crank radius r. More specifically, each of the side webs 19b, 19c has, as shown in FIG. 5, a balancer weight whose center of gravity is positioned as indicated by the arrows (A), (C), and whose weight is W/2 so that the moment of inertia thereof is W/2×r. The central web 19a has, as shown in FIG. 5, a balancer weight 31a whose center of gravity is indicated by the arrow (B) and whose weight is $W \times \cos \alpha/2$, providing a moment of inertia of $W/2 \times r \times \cos \alpha/2$. Since $W = m + \frac{1}{2}M$, the moments of inertia can be expressed as $\frac{1}{2}W \times r = (\frac{1}{2}m + \frac{1}{4}M) \times r$ for the side webs 19b, 19c, and $W \times r \times \cos (\alpha/2) = (m + \frac{1}{2}M) \times r \times \cos (\alpha/2)$ for the central web 19a.

With the distribution of the balancer weights as described above, both the primary inertial forces due to mass of the rotating parts can be cancelled out enabling the provision of an engine with minimized vibration.

In the above constitution, half of the mass of the reciprocating parts ($\frac{1}{2}M$) is used just to cancel the primary inertial force so that, when dealing with primary vibrations, it is sufficient to locate the weight along a line l bisecting the angle $\alpha$ between the crank pins 11, 12 on the side opposite to the crank pins. To prevent the couples, however, either the weights have to be of the same distribution as that of the masses of the rotating parts or the central web 19a has to have a balancer weight of a mass for two cylinders, that is, $2 \times \frac{1}{2}M$. However, in the latter case, the mass is concentrated on the central web 19a so that the central web is much larger when compared with the side webs 19a, 19c. This is not desirable in terms of layout design.

It is readily apparent that the above-described crank shaft meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference would be made to the following claims in determining the full scope of the invention.

What is claimed is:

1. In a V-type internal-combustion engine including a three-web, two pin type crank shaft having a central web, and two crank pins carried between said central and each of said side webs, said crank pins having rotary phases offset from each other by an angle of $\alpha$ for cancelling out primary inertial force caused by the mass of reciprocating parts, the improvement wherein each said side web is respectively provided with a balancer weight having a mass of at least $W/2$ corresponding to half of a sum of W of half the mass of the reciprocating parts and the mass of rotating parts of one cylinder on a side opposite to a corresponding crank pin, and said central web is provided with a balancer weight having a maximum mass of $W \times \cos \alpha/2$ on a line bisecting the angle $\alpha$ between said crank pins on a side opposite to said crank pins.

2. A crank shaft of a V-type internal-combustion engine as claimed in claim 1, wherein axial widths of said central and side webs on said crank shaft are substantially equal to each other.

3. A crank shaft of a V-type internal-combustion engine as claimed in claim 1, further comprising two engine cylinders disposed with an angle of $\beta$ therebetween, there being established between the angles $\alpha$ and $\beta$ a relationship of $\alpha = \pi - 2\beta$.

4. In a V-type internal-combustion engine including a first and a second cylinder arranged so as to form a V shape on a vehicle body frame, a piston slidably and reciprocally engaged in each of said first and second cylinders, and a crank shaft connected to said pistons by connecting rods, said crank shaft comprising a central web, side webs arranged on both sides of said central web, and two crank pins carried between said central and each of said side webs and connected to said connecting rods, said crank pins being arranged so that rotary phases thereof with respect to a central axis of the crank shaft are offset by an angle of $\alpha$, the improvement comprising said side webs each carrying a balancer weight having a mass of $W/2$ corresponding to half of a sum W of half the mass of the reciprocating parts and the mass of the rotating parts for one cylinder in such a manner that a center of gravity of said balancer weight is positioned at a distance of crank radius r (a distance from said central axis to a center of the crank pin) from a central axis of a crank axis of the crank shaft on a side opposite to said crank pin across the axis of said crank shaft, and said central web carrying a balancer weight having a mass of $W \times \cos (\alpha/2)$ in such a manner that its center of gravity is positioned at a distance of crank radius r along a line bisecting the angle $\alpha$ between said crank pins on the side opposite to said crank pins across the central axis of the crank shaft.

* * * * *